(No Model.)
H. McDONALD.
YOKE FOR REAR FORKS OF BICYCLES.
No. 591,286. Patented Oct. 5, 1897.
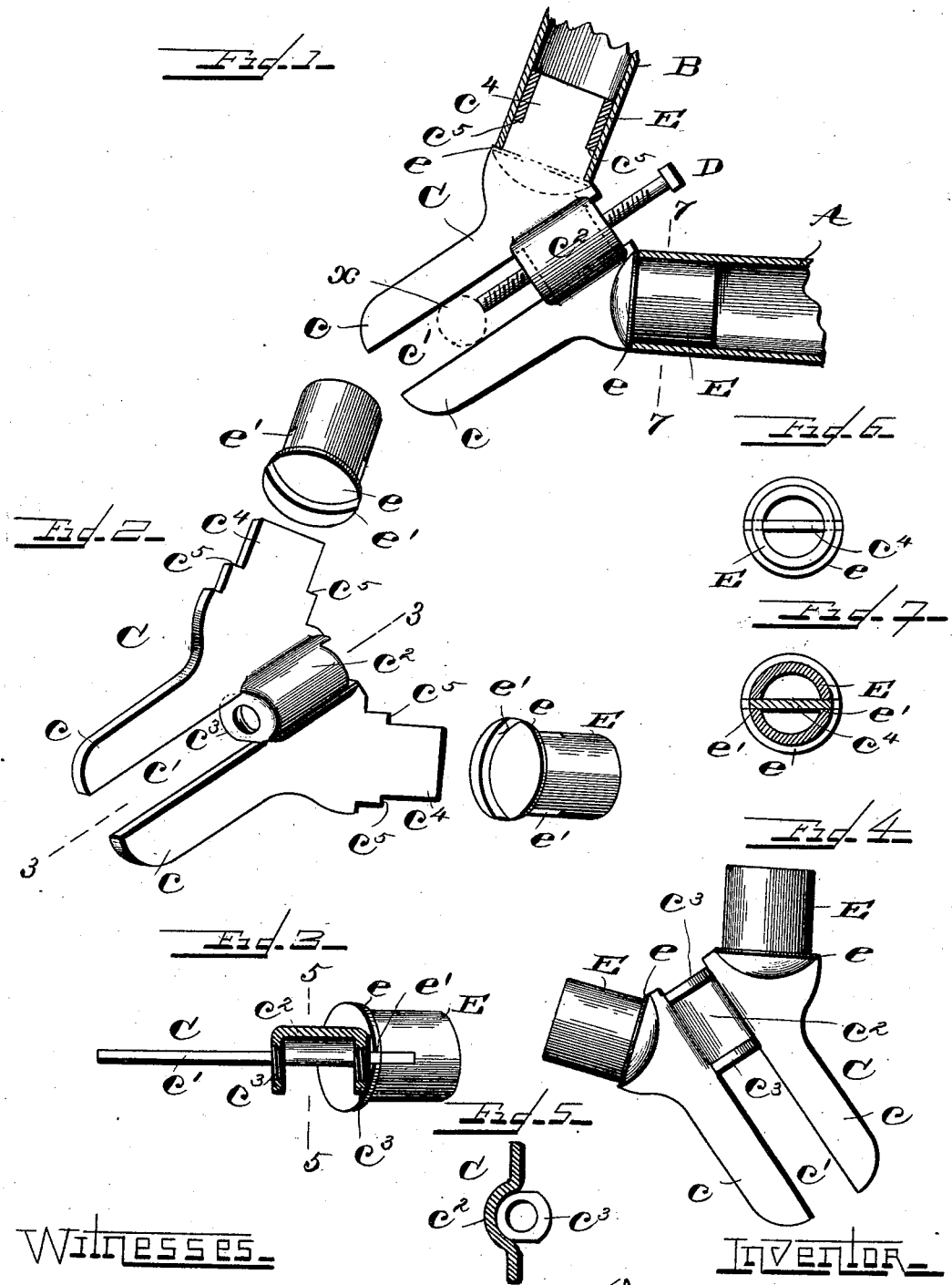
Witnesses
G. A. Tauberschmidt,
J. D. Kingsbury
Inventor
Hugh McDonald
By Whitaker & Prevost
Attys.

UNITED STATES PATENT OFFICE.

HUGH McDONALD, OF WILLIAMSPORT, PENNSYLVANIA.

YOKE FOR REAR FORKS OF BICYCLES.

SPECIFICATION forming part of Letters Patent No. 591,286, dated October 5, 1897.

Application filed March 13, 1897. Serial No. 627,314. (No model.)

*To all whom it may concern:*

Be it known that I, HUGH McDONALD, a citizen of the United States, residing at Williamsport, in the county of Lycoming and State of Pennsylvania, have invented certain new and useful Improvements in Yokes for the Rear Forks of Bicycles; and I do hereby declare the following to be a full, clear, and exact description of the invention, such as will enable others skilled in the art to which it appertains to make and use the same.

My invention consists in the novel features hereinafter described, reference being had to the accompanying drawings, which illustrate one form in which I have contemplated embodying my invention; and said invention is fully disclosed in the following description and claims.

The object of my invention is to provide a yoke or fork end for the rear ends of the rear fork of a bicycle constructed to provide for the adjustment of the rear axle and adapted to be cheaply and easily made by stamping or otherwise from a single piece of sheet material, such as sheet-steel.

It also provides convenient means for attaching these yokes to the frame-bars forming the rear fork.

In the drawings, Figure 1 represents a side elevation of one of the yokes embodying my invention, the adjacent parts of the frame-bars and the attaching-thimbles being shown in section. Fig. 2 is a perspective view representing the yoke and its attaching-thimbles separated. Fig. 3 is a horizontal sectional view on line 3 3 of Fig. 2. Fig. 4 is a side elevation of the yoke, showing the side opposite the one shown in Figs. 1 and 2. Fig. 5 represents a vertical section on line 5 5 of Fig. 3. Fig. 6 is an end view of one of the tangs with thimble attached. Fig. 7 is a transverse section through the tang and thimble on line 7 7 of Fig. 1.

The rear fork of the bicycle now in general use is formed of two side frames, each consisting of a substantially horizontal hollow bar A and an inclined upwardly-extending bar B. My improved yokes are designed to connect these two bars on each side of the machine and provide means for receiving and adjusting the axle of the rear wheel.

C represents the yoke, which is formed of sheet material, preferably sheet-steel, and is drop-forged or cold-stamped in a single piece. The yoke is provided at its rear end with an open portion, formed by two rearwardly-extending arms $c\ c$, having their inner edges parallel and at a distance apart sufficient to receive one end of the axle of the rear wheel. (Shown in dotted lines at $x$ in Fig. 1.) In line with the slot $c'$ between the arms $c\ c$ and at the front part of the yoke is a struck-up semi-cylindrical or dished portion $c^2$, formed from the plate from which the yoke is made, and forming a groove on one side of the yoke extending from the slot $c'$ to the front edge of the plate. At each end of the dished portion $c^2$ is a struck-up lug or ear $c^3$, which is perforated centrally and the aperture screw-threaded to receive an adjusting-screw D, which passes through said ears $c^3$ and engages the axle $x$ for adjusting the same. It will be seen by reference to Fig. 5 that by providing the dished or offset portion $c^2$ between the ears $c^3\ c^3$ the apertures in said ears are brought substantially into the vertical plane of the plate, and the screw D will lie in the groove thus formed in the plate.

The front end of the plate is provided with a pair of shouldered tangs $c^4\ c^4$, provided with shoulders $c^5\ c^5$, which receive the attaching-thimbles E. Each of these thimbles consists, as shown, of a cylindrical body having a reinforcing top flange $e$ wider than the main body, the top flange and main body being slotted, as shown at $e'$. One of these thimbles is slipped on each tang $c^4$ until the end of the slotted portion $e'$ of the thimble abuts against the shouldered portion $c^5$ of the tang, which is of the same diameter as the thimble. The thimbles E are then secured to the tangs in any desired manner, as by brazing, swaging, or riveting. The external diameters of the thimbles correspond exactly to the internal diameters of the frame-bars A and B, into which they are inserted until the ends of the bars come into contact with the top flanges $e$ of the thimbles. The parts are then secured together by brazing or otherwise.

My improved yokes can be very quickly and cheaply made, and as they are struck from a single piece of metal there are no loose parts to get lost or out of order or to be assembled in setting up the machine.

I do not limit myself to the use of the thimbles for attaching the yoke to the frame-bars, as it may be attached in other ways.

What I claim, and desire to secure by Letters Patent, is—

1. A yoke for the rear fork of a bicycle formed of a single piece of sheet metal provided with a slot to receive the axle, a dished portion in line therewith, and having integral projecting portions at each end of said dished portion provided with threaded portions to receive an adjusting-screw, substantially as described.

2. A yoke for the rear fork of a bicycle formed of a single piece of sheet metal, provided with a slot to receive the axle, a dished portion in line therewith, and a struck-up perforated ear at each end of said dished portion, disposed perpendicularly to the main body of the yoke, and having their perforations, substantially in the plane of the main body of the yoke, substantially as described.

In testimony whereof I affix my signature in presence of two witnesses.

HUGH McDONALD.

Witnesses:
HUGH GILMORE,
C. LA RUE MUNSON.